United States Patent
Zhao et al.

(10) Patent No.: US 8,514,671 B2
(45) Date of Patent: Aug. 20, 2013

(54) LASER RECESS HEAD GIMBAL ASSEMBLY

(75) Inventors: Yongjun Zhao, Eden Prairie, MN (US); Mike Allen Seigler, Eden Prairie, MN (US); Mark Henry Ostrowski, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/194,815

(22) Filed: Jul. 29, 2011

(65) Prior Publication Data

US 2013/0028060 A1    Jan. 31, 2013

(51) Int. Cl.
*G11B 5/00*    (2006.01)

(52) U.S. Cl.
USPC .............. 369/13.24; 369/13.34; 369/13.32; 369/13.33; 360/114.02; 360/123.36

(58) Field of Classification Search
USPC .......... 369/13.02, 13.05, 13.24, 13.34, 13.32, 369/13.33; 360/114.02, 123.36
See application file for complete search history.

(56) References Cited

U.S. PATENT DOCUMENTS

| | | | |
|---|---|---|---|
| 4,802,042 A | 1/1989 | Strom | |
| 6,381,098 B1 | 4/2002 | Boutaghou et al. | |
| 7,365,941 B2* | 4/2008 | Poon et al. | 360/125.01 |
| 2002/0167870 A1* | 11/2002 | Akiyama et al. | 369/13.33 |
| 2005/0190496 A1* | 9/2005 | Hamann et al. | 360/128 |
| 2006/0075417 A1* | 4/2006 | Miyanishi et al. | 720/658 |
| 2007/0286031 A1* | 12/2007 | Matsumoto | 369/13.13 |
| 2008/0055763 A1* | 3/2008 | Tanaka et al. | 360/59 |
| 2009/0052076 A1* | 2/2009 | Shimazawa et al. | 360/59 |
| 2009/0225636 A1* | 9/2009 | Hirano et al. | 369/13.24 |
| 2009/0310459 A1 | 12/2009 | Gage et al. | |
| 2010/0165499 A1* | 7/2010 | Stipe | 360/59 |
| 2011/0170381 A1* | 7/2011 | Matsumoto | 369/13.33 |
| 2012/0044967 A1* | 2/2012 | Cole et al. | 372/92 |

* cited by examiner

*Primary Examiner* — Thomas Alunkal
(74) *Attorney, Agent, or Firm* — Hall Estill Attorneys at Law

(57) ABSTRACT

A slider may have a first surface on an air bearing surface (ABS) and a laser recess formed in a second surface of the slider, opposite the first surface. A laser can then be positioned in the laser recess with the laser extending from the slider to a top plane. A stud may be formed adjacent to and separated from the laser on the second surface of the slider with the stud extending from the second surface of the slider to the top plane.

20 Claims, 5 Drawing Sheets

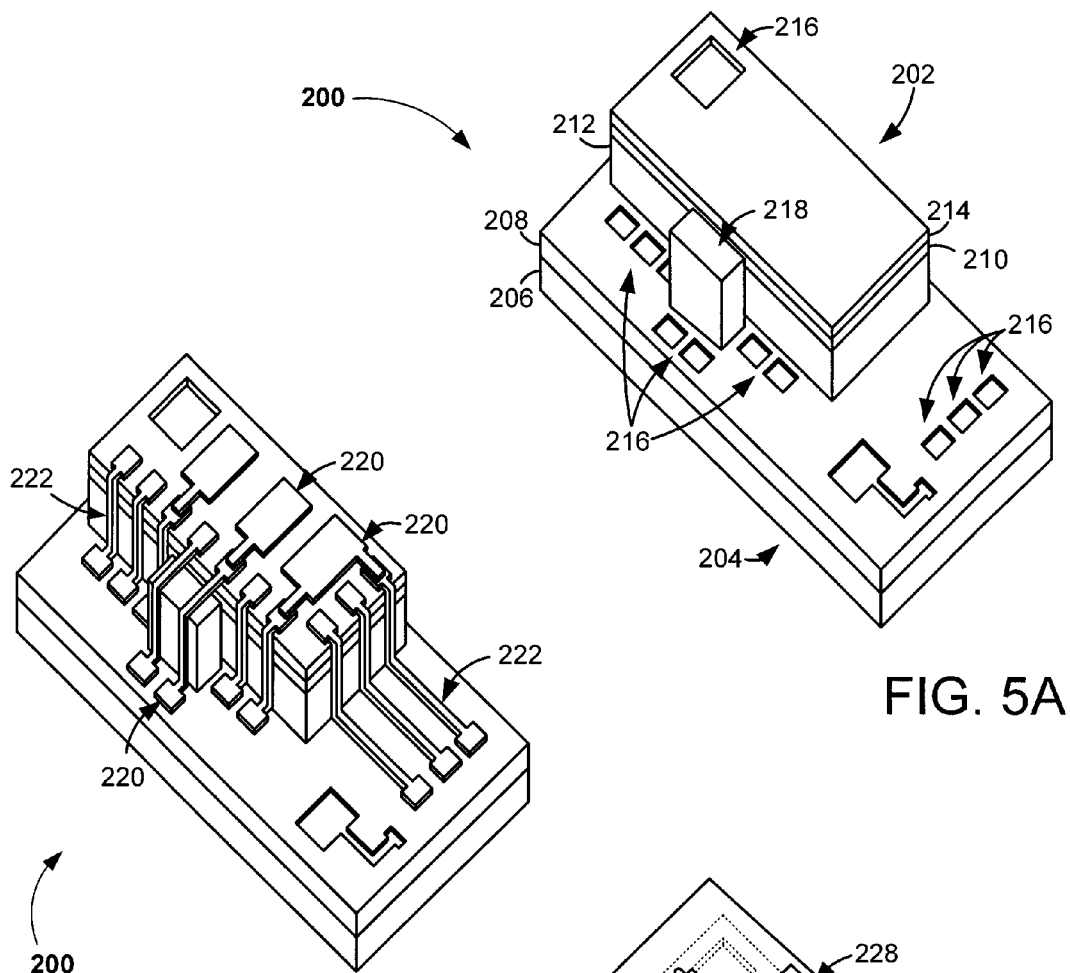
FIG. 5A
FIG. 5B
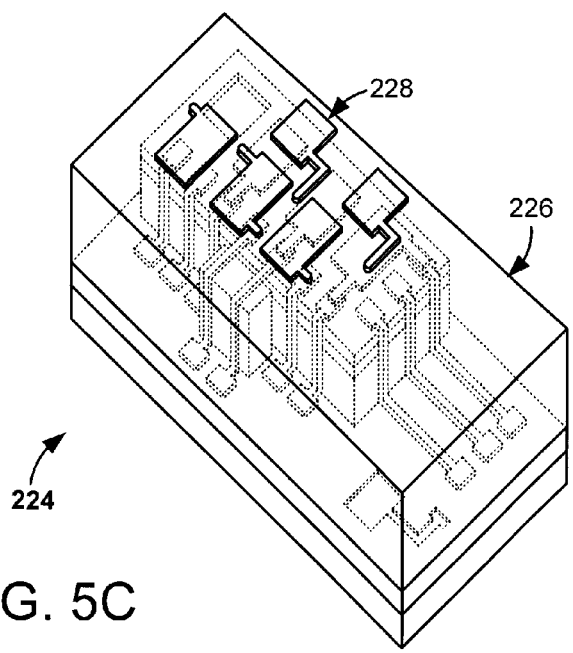
FIG. 5C

LASER RECESS HEAD GIMBAL ASSEMBLY

SUMMARY

Various embodiments of the present invention are generally directed to a slider that may have a first surface on an air bearing surface (ABS) and a laser recess formed in a second surface of the slider, opposite the first surface. A laser can then be positioned in the laser recess with the laser extending from the slider to a top plane. A stud may be formed adjacent to and separated from the laser on the second surface of the slider with the stud extending from the second surface of the slider to the top plane.

BRIEF DESCRIPTION OF THE DRAWINGS

FIGS. 5A-5C illustrate isometric views of example slider assemblies constructed in accordance with various embodiments of the present invention.

DETAILED DESCRIPTION

The present disclosure generally relates to the writing of data to a memory space, and in particular to methods and architecture to improve data transfer speed and data storage capacity of a rotatable data media. A higher demand for increased data capacity often relies on fitting more data bits in a given area on a storage media and accessing those data bits at a higher rate. A laser may be used in a data storage device to increase data capacity through increased areal density transfer rates by heating data bit locations in a data storage media immediately prior to writing data to those data bit locations, which can be characterized as heat assisted magnetic recording (HAMR).

However, inclusion of a laser into a data storage device can be problematic due to limited physical space and precise laser operation that can be associated with increased areal density and reduced form factor data storage devices. When integrating a laser into a data writing element, the laser can be encapsulated to provide electrical and mechanical protection, but with the addition of the physical size of the encapsulating material to the data writing element.

While various processes can be undertaken to reduce the physical size of the encapsulating material, such processes often lack the precision to remove material without damaging portions of the laser and preventing various electrical contacts to be formed on the laser. Thus, improving the construction of a data writing element employing a laser plays an increasingly important role in electronic devices with higher data capacity.

Accordingly, embodiments of the present invention provide a data writing element with a slider having a first surface on an air bearing surface (ABS) and a laser recess formed in a second surface of the slider, opposite the first surface. A laser positioned in the laser recess and extending from the slider to a top plane may have one or more studs adjacent to and separated from the laser on the second surface of the slider with each stud extending from the second surface of the slider to the top plane. The placement of the studs adjacent to and separated from the laser provides electrical connections between the second surface of the slider and the top surface of the laser to be made along a common plane.

Figure 1:
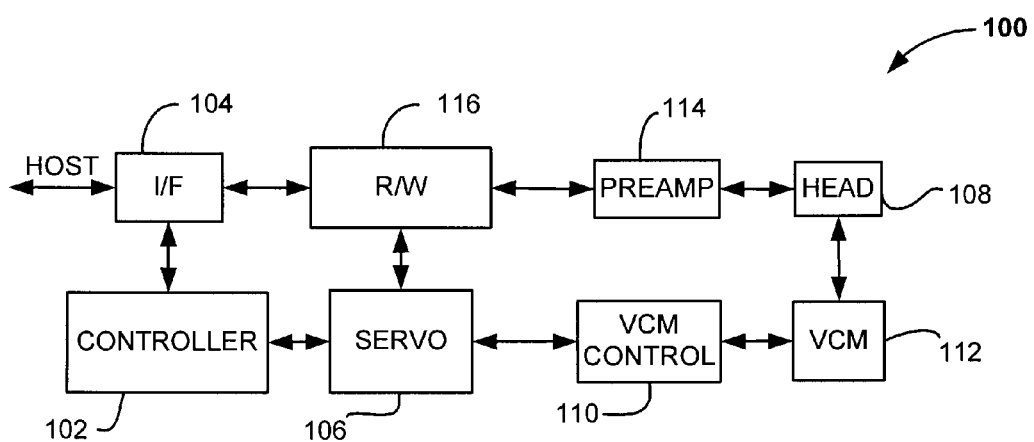
FIG. 1 generally illustrates a block functional diagram of an example control circuitry for a data storage device capable of being used with various embodiments herein.

With regard to FIG. 1, a functional block representation of an exemplary control circuitry 100 is provided that is capable of managing the operation a data storage device including, without limitation, a heat source and heat source control circuitry. A programmable controller 102 provides top level control for the circuitry 100. The controller 102 interfaces with a host device (not shown) via an interface (I/F) circuit 104. The I/F circuit 104 includes a buffer (not shown) that temporarily stores data during transfers between the host and a recordable medium. A servo circuit 106 uses servo control data transduced from the disk surfaces to provide positional control for the heads 108. The servo circuit 106 supplies current commands to a voice coil motor (VCM) control driver 110 to apply suitable currents to the VCM 112 in order to position the heads 108 to write data to the recordable medium during a write operation through a preamplifier/driver circuit (preamp) 114 that cooperates with a read/write (R/W) channel 116.

Figure 2:
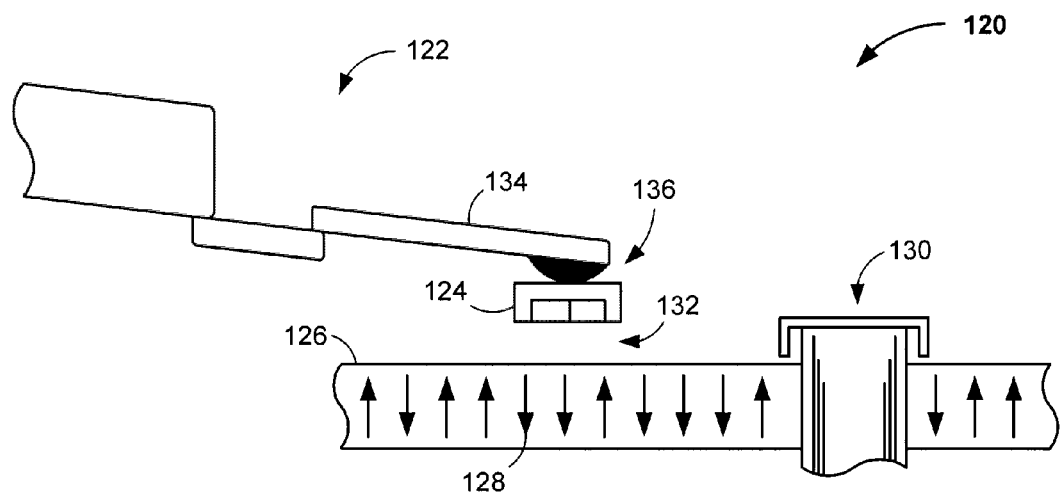
FIG. 2 is a block representation of an example portion of a data storage device.

An embodiment of a recording portion 120 of a data storage device capable of using the control circuitry 100 of FIG. 1 is generally provided in FIG. 2. As shown, the recording portion 120 is present in a non-limiting environment in which various embodiments of the present invention can be practiced. The recording portion 120 has an actuating assembly 122 that positions a transducing head 124 over a magnetic storage media 126 that is capable of storing programmed bits 128.

In various embodiments, the storage media 126 is attached to a spindle motor 130 that rotates during use to produce an air bearing surface (ABS) 132 on which a slider portion 134 of the actuating assembly 122 flies to position a head gimbal assembly (HGA) 136, which includes the transducing head 124, over a predetermined portion of the media 126. The transducing head 124 can include one or more transducing elements, such as a magnetic writer and magnetically responsive reader, which operate to program and read data from the storage media 126, respectively. In this way, controlled motion of the actuating assembly 122 causes the transducers to align with tracks (not shown) defined on the storage media surfaces to write, read, and rewrite data.

It can be appreciated that when a number of media are closely stacked in modern data storage devices, physical space between the media for more than one HGA 136 can be limited. The physical space can further be limited by the inclusion of laser assemblies attached to each HGA. While the space requirements of a laser assembly can be accommodated for, the laser assembly may be encapsulated in a material that aids reliability and performance, but increases the physical size of the laser assembly, thereby potentially interfering with adjacent HGAs corresponding to adjacent media.

The thickness of the encapsulating material deposited onto the laser assembly is not limited to a particular embodiment, but may be thinned to reduce the profile of the encapsulated laser assembly combination. Such thinning may prove disadvantageous as various electrical connections are not compatible, such as double-side connections, and in the event the laser assembly is harmed during the process. For these and other reasons, reducing the physical size of an encapsulated laser assembly without thinning can provide numerous electrical connection possibilities while enhancing manufacturing inefficiency and reliability.

Figure 3A:
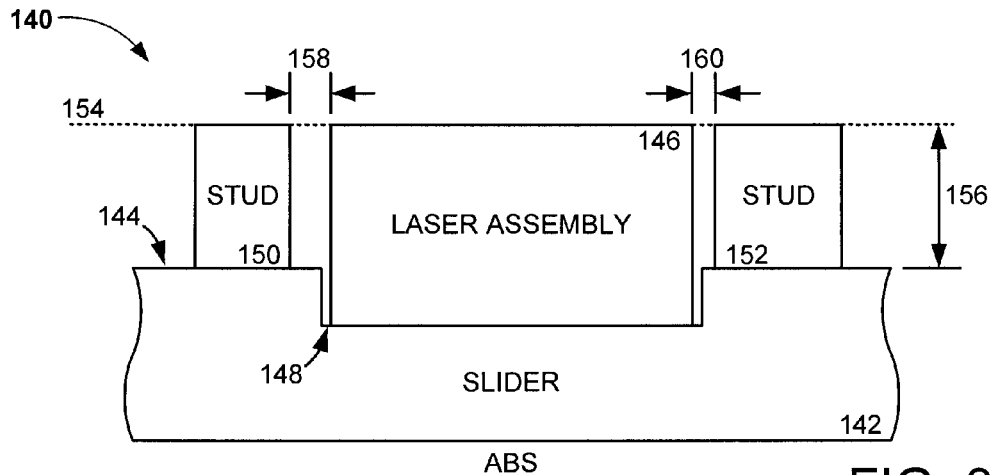
FIGS. 3A-3C display example slider assemblies capable of being used in the data storage device of FIG. 1.
Figure 3B:
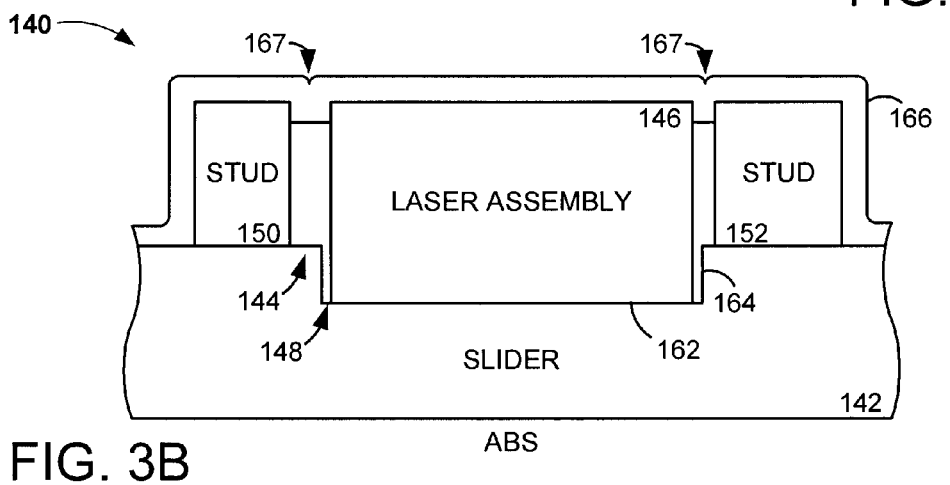
Figure 3C:
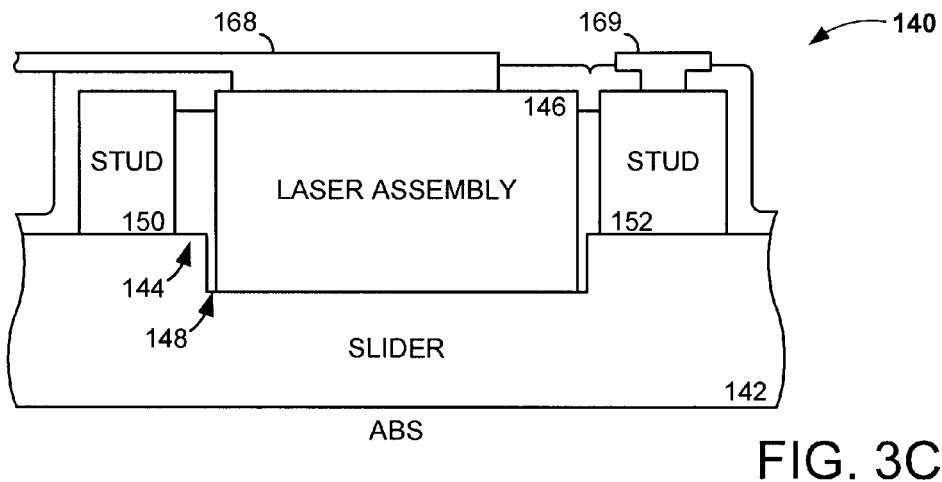

FIGS. 3A-3C generally depict an example encapsulation of a portion of a slider assembly 140 in accordance with various embodiments of the present invention. The slider assembly 140 has a slider 142 with an air bearing surface (ABS) and configured to float on the ABS during operation. On a top surface 144 of the slider 142 opposite the ABS, a laser assembly 146 is positioned in a recessed region 148 of the top surface 144. While not limited to a particular depth, size, and location on the top surface 144, the recessed region 148 can be configured to encompass the entire dimensions of the laser assembly 146 and, in some embodiments, at least one stud, such as first and second studs 150 and 152.

The first and second studs 150 and 152 are not limited to a size, shape, or material, but in various embodiments are formed of dissimilar profiles, such as continuously curvilinear and rectangular shapes, and with dissimilar lateral dimensions. As shown, the first stud 150 may have a smaller lateral width than the second stud 152. Regardless of the lateral size and shape, each stud 150 and 152 can be formed to extend from the top surface 144 of the slider 142, inside or outside of the recessed region 148, to the top plane 154.

Whether formed in or out of the recessed region 148, the laser assembly 146 and studs 150 and 152 may continuously extend from the top surface 144 to a top plane 154. The uniform height of the top plane 154 across the slider 142 and parallel with the top surface 144 can allow efficient processing and formation of various electrical connections. However, the common height 156 of the laser assembly 146 and studs 150 and 152 does not mandate the physical interconnection of the components at the top plane and surface 154 and 144. That is, the studs 150 and 152 and laser assembly 146 can be separated by uniform or non-uniform gaps of predetermined length from the top plane 154 to the top surface 144, such as lengths 158 and 160 that respectively correspond to the distance between the laser assembly 146 and the first and second studs 150 and 152.

It should be noted that a variety of recess region 148 configurations can be used to accommodate various operating characteristics. In the example shown in FIGS. 3A-3C, the recess region 148 has a uniform elevation surface 162 that is substantially parallel to the ABS and the top surface 144 with orthogonal sidewalls 164. The recess region 148 may be manipulated from such example to have a plurality of elevation surfaces 162 with different depths into the slider 142 and with shaped sidewalls, such as curvilinear or beveled sidewalls that transition the top surface 144 to the elevation surface 162. With such variable recessed region 148 configurations, a wide variety of laser assembly designs can be used to tune and optimize the laser strength by increasing the laser assembly cavity and the profile shape of the slider assembly 140 by adjusting the position of the top plane 154.

The unlimited ability to tune and optimize the slider assembly 140 configuration for various structural and operational characteristics further extends to the position, size, and number of studs 150 and 152 on the top surface 144. The structural characteristics of the studs 150 and 152, such as conductive or dielectric material construction, can provide a number of different operational functions both in isolation and in combination with the laser assembly 146. The structural characteristics of the size and position of the studs 150 and 152 may further be precisely chosen to provide predetermined encapsulation behavior of an encapsulating material 166, as displayed in FIG. 3B.

An evaluation of FIG. 3B reveals how the studs 150 and 152 can be placed to manipulate the gap lengths 158 and 160 of FIG. 3A and allow for minimal deposition of the encapsulation material 166 to close the gaps and the seal the laser assembly 146 from the external environment. As shown, the position of the studs 150 and 152 can form cleavage regions 167 about the laser assembly 146 where encapsulation material 166 partially settles in each gap to seal laser assembly 146 without having to coat the sides of the assembly 146. That is, the position of the studs 150 and 152 in relation to the laser assembly 146 allows the encapsulation material 166 to seal the laser assembly 146 with a single continuous thin layer of material across the top plane 154 as opposed to coating each side of the laser assembly 146, which can be difficult in small form factor slider assemblies 140.

While the encapsulation material 166 is not limited to an individual or combination of deposition processes, atomic layer deposition may be used in various embodiments to produce the continuous encapsulation layer that seals the laser assembly 146 by sealing the gaps between the studs 150 and 152 and the assembly 146. In an example encapsulation material deposition, the widest gap 158 between a stud 150 and the laser assembly 146 is 20 um, then a 10 um thick encapsulation material 166 deposition can be used to reliably seal the laser assembly from the top.

A lack of concern for the sealing of the sides of the studs 150 and 152 due to the sealed air pocket located between the laser assembly 146, studs 150, and 152 and beneath the encapsulation material 166 allows for efficient material deposition without increased complexity that can correspond with sealing orthogonal surfaces.

With the encapsulation material 166 formed across the top plane 154 to seal the laser assembly 146, the slider assembly 140 can further undergo processing to electrically interconnect at least the laser assembly 146 with other portions of a data storage device, such as the controller 102 of FIG. 1. FIG. 3C generally shows how various electrical interconnects 168 and 169 can contactingly engage the laser assembly 146 and stud 152. The electrical interconnects 168 and 169 can be constructed after removing portions of the encapsulating material 166 without disrupting the seal formed about the laser assembly 146.

The first electrical interconnect 168 extends laterally from the laser assembly 146 without contacting the immediately adjacent stud 150. In some embodiments, the first electrical interconnect 168 laterally spans from the laser assembly 146 over the stud 150 to another stud (not shown), which may or may not be encapsulated by the encapsulation material 166. However, the first electrical interconnect 168 could likewise contact multiple studs in combination with the laser assembly 146, without restriction or limitation.

The second electrical interconnect 169 contacts the stud 152 and provides a conductive pad for other interconnects, such as traces and vias. Such interconnect configuration allows other electrical interconnections to be brought up to the top plane 154, thus reducing or eliminating inefficient formation of conductive pads in tight regions of slider 142. The raising of the electrical interconnections 168 and 169 further allows for formation of the interconnections without any thinning of the encapsulation material 166, which, as discussed above, can contribute to loss of slide assembly 140 performance.

Figure 4A:
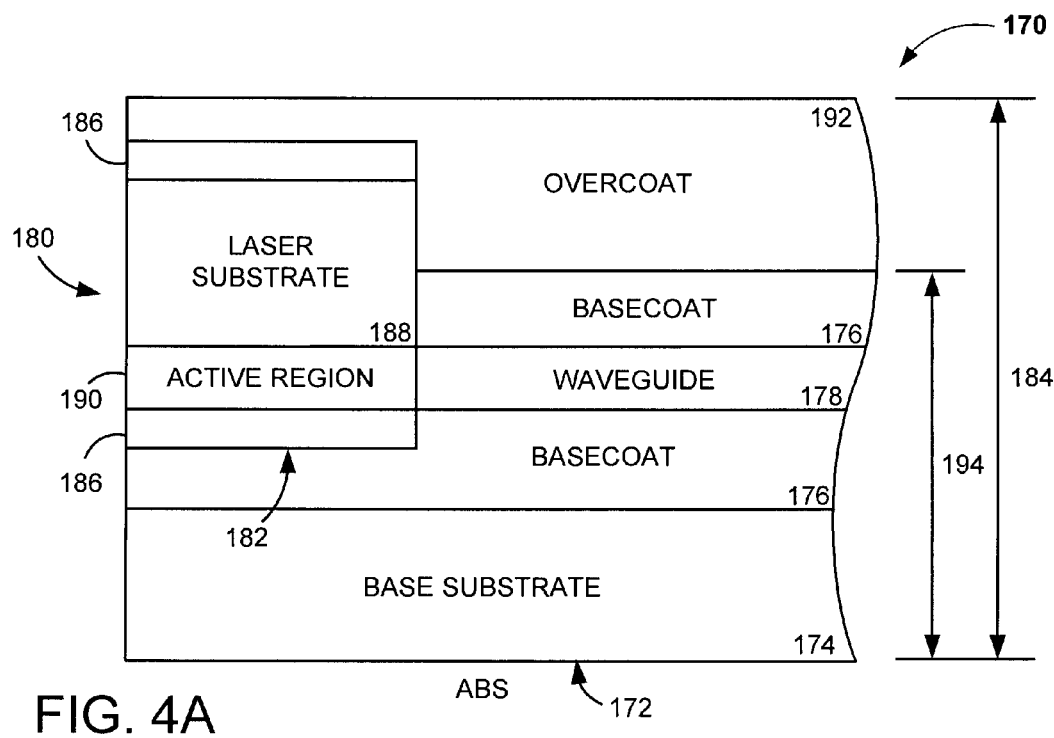
FIGS. 4A & 4B provide example cross-sectional views of slider assemblies constructed in accordance with various embodiments.
Figure 4B:
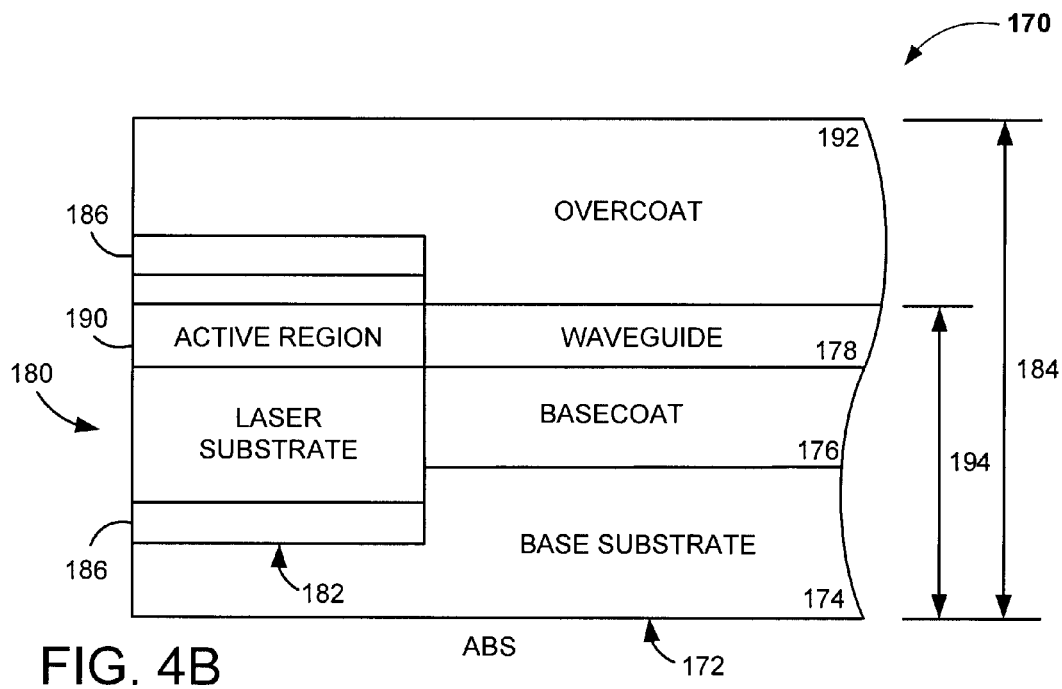

The connection of the laser assembly 146 and first electrical interconnection 168 is not limited to the top surface 144 and can be located at a variety of different locations with the construction of a laser contact pad. FIGS. 4A & 4B generally display example cross-section views of portions of a slider assembly 170 as configured in accordance with various embodiments of the present invention. In FIG. 4A, slider assembly 170 has a slider 172 that includes at least a base substrate 174 that is positioned on the ABS and is constructed of any predetermined material, which in some embodiments is AlTiC. The substrate may be shaped in various configurations, such as negative and positive pressure designs, while retaining a data transducing element (not shown) that interacts with an adjacent data storage media across the ABS.

A basecoat 176 can be directly adjacent the base substrate 174 and constructed with various predetermined material characteristics, such as enhanced step or optical coverage. Such enhanced optical coverage can increase the performance of a waveguide layer 178 that can be formed either independently or in conjunction with the basecoat 176. With at least a portion of the basecoat 176 deposited, a laser assembly 180 can be positioned in a recessed notch 182 of the basecoat 176. That is, a region of the basecoat and waveguide 176 and 178 may be removed to accommodate at least the lateral dimensions of the laser assembly 180, which can allow the laser assembly 180 to rest closer to the base substrate 174 and reduce the vertical profile 184 of the slider assembly 170.

The laser assembly 180 can have one or more contact pads 186 positioned on any part of the laser substrate 188 to allow a plurality of electrical interconnects to commonly or independently control the active region 190 of the laser assembly. The positioning of the laser assembly 180 and the active region 190 can be aligned, as shown, with the waveguide layer 178, which can be configured to direct laser energy to designated portions of an adjacent data storage media.

With the laser assembly 180 positioned in the recessed notch 182 and aligned with the waveguide layer 178, an overcoat layer 192 can be deposited to encapsulate the laser assembly 180 and protect the operation of the active region 190, as discussed above. In the embodiment displayed in FIG. 4A, the basecoat 176 and waveguide layer 178 are laminated together and disposed in contacting adjacency with the overcoat. Such waveguide layer 178 and basecoat 176 lamination is not limited, but can provide an added amount of protection from trauma during and after the formation of electrical interconnects attached to the contact pads 186 of the laser assembly 180.

While not explicitly displayed in FIGS. 4A & 4B, any number of studs, such as stud 150 of FIG. 3A, can be formed as part of the slider assembly 170. For example, a stud can be directly attached to the base substrate 174 and have an aperture that allows unimpeded access from the active region 190 to through the waveguide layer 178. It should be noted that the overcoat 192 and basecoat 176 can be manipulated and processed into a variety of configurations without any thinning procedures, which can result in a fully encapsulated laser assembly 180 with minimal overcoat thickness, as illustrated by the difference in the slider vertical height 194 compared to the vertical profile 184.

In another embodiment of the slider assembly 170 shown in FIG. 4B, instead of the basecoat 176 solely having the recessed notch 182, portions of the base substrate 174 have been notched to bring the laser assembly 180 closer to the ABS, thus reducing the profile 196 of the slider assembly 170. The lowering of the laser assembly 180 in the base substrate 174 can correspond with the relocation of the active region 190 and waveguide layer 178 to provide laser energy above the basecoat 176. Such active region 190 relocation can further correspond with the laser substrate 188 surrounding the active region 190 while providing a buffer between it and the contact pads 186.

The position of the laser assembly 180 in the base substrate 174 may provide a number of performance enhancing characteristics, such as heat sinking and the use of a thicker overcoat 192 compared to the overcoat used in FIG. 4A. The thicker overcoat 192 of FIG. 4B can allow more secure encapsulation of the laser assembly 180 and more material to embed and isolate electrical interconnections formed in the slider assembly 170. The lowering of the laser assembly 180 can further allow for the tuning of the laser's energy, such as with rotation and enlargement of the active region 190 to provide greater laser output.

However, the use of the recessed notch 182 to lower the laser assembly 180, whether formed in the base substrate 174 or not, is not required or limited as positioning the laser assembly 180 on top of the basecoat 176, as displayed in FIGS. 5A and 5B, is done in various embodiments of the present invention. FIG. 5A illustrates an isometric view of an example slider assembly 200 with a laser assembly 202 atop the slider 204, which includes at least a base layer 206 and a basecoat 208. The laser assembly 202 is displayed with a back electrode 210 disposed between a laser 212 and a dielectric encapsulation layer 214. A number of contact pads 216 are exposed in the encapsulation layer 214 and the basecoat 208 and can be formed either during formation or through a supplemental material removal process, such as etching or wet etching.

A single stud 218 can be formed adjacent to, but separated from, the laser assembly 202. However, a plurality of similar or dissimilar studs can be used to surround as little or as much of the laser assembly 202 to tune the profile and performance of the slider assembly 200. As discussed above, the encapsulation layer 214 can extend over one or more studs 218 to seal the laser assembly 202 with the formation of an air pocket between the stud 218 and assembly 202. Regardless of the position and number of studs 218, various electrical interconnects can be formed on and around the laser assembly 202.

FIG. 5B displays the slider assembly 200 after the formation of various interconnection pads 220 and interconnection traces 222 on the top and along the sides of the laser assembly 202. When an encapsulation layer is reduced through a thinning process, as discussed above, thermal budget for the laser assembly can restrict the use of some electrical contacts, such as double side contacts, from being formed on and around the assembly 200. In contrast, depositing and processing the encapsulation layer 214 without thinning allows double side contacts of the laser various pads 220 and traces 222 to be formed throughout the laser assembly 202 without adversely affecting operation of the assembly 202.

Additionally, the use of the top side of the laser assembly 202 to interconnect the various electrical components provides efficient and reliable manufacturing as each pad 220 and trace 222 can be formed partially or wholly on the uniform top surface, as shown by the top plane 154 of FIG. 3A, of the laser assembly 202 and each stud 218. With the ability to bring the electrical interconnects up to a uniform plane, the performance of the HGA 200 can be tuned through modification of the number, type, and length of the various pads 220 and traces 222.

As shown in FIG. 5B, the interconnect traces 222 can be formed to continuously flow from the top surface of the laser assembly 202 to the slider 204, which allows for some or all of the slider electronics to be precisely joined at the top surface of the laser assembly 202. In some embodiments, the space between each stud 218 and the laser assembly 202 is filled with a predetermined material prior to the formation of the electrical interconnects, which may allow for more efficient and precise formation and connection of the various electrical pads 220 and traces 222.

While the formed electrical pads 220 and traces 222 can remain exposed on the top surface of the laser assembly 202, a second encapsulation layer 226, as displayed in FIG. 5C, may be subsequently deposited onto the slider assembly 200. The encapsulation of both the laser assembly 202 and electrical interconnects 220 and 222 can provide an additional level of reliability that the electrical components and junctions are maintained as formed.

The additional encapsulation, however, is not required or limited to a particular material or extent. That is, any additional encapsulation layers 226 can be dissimilar materials from the first encapsulation layer 214 and may be deposited to span some or all of the laser assembly 202 and slider 204. For example, separate additional encapsulation layers can seal the slider 204 and the laser assembly 202 including each stud 218, respectively. Any supplemental encapsulation layers can further serve as a substrate to form additional electrical interconnects that may or may not connect with the underlying pads 220 and traces 222.

Figure 6:
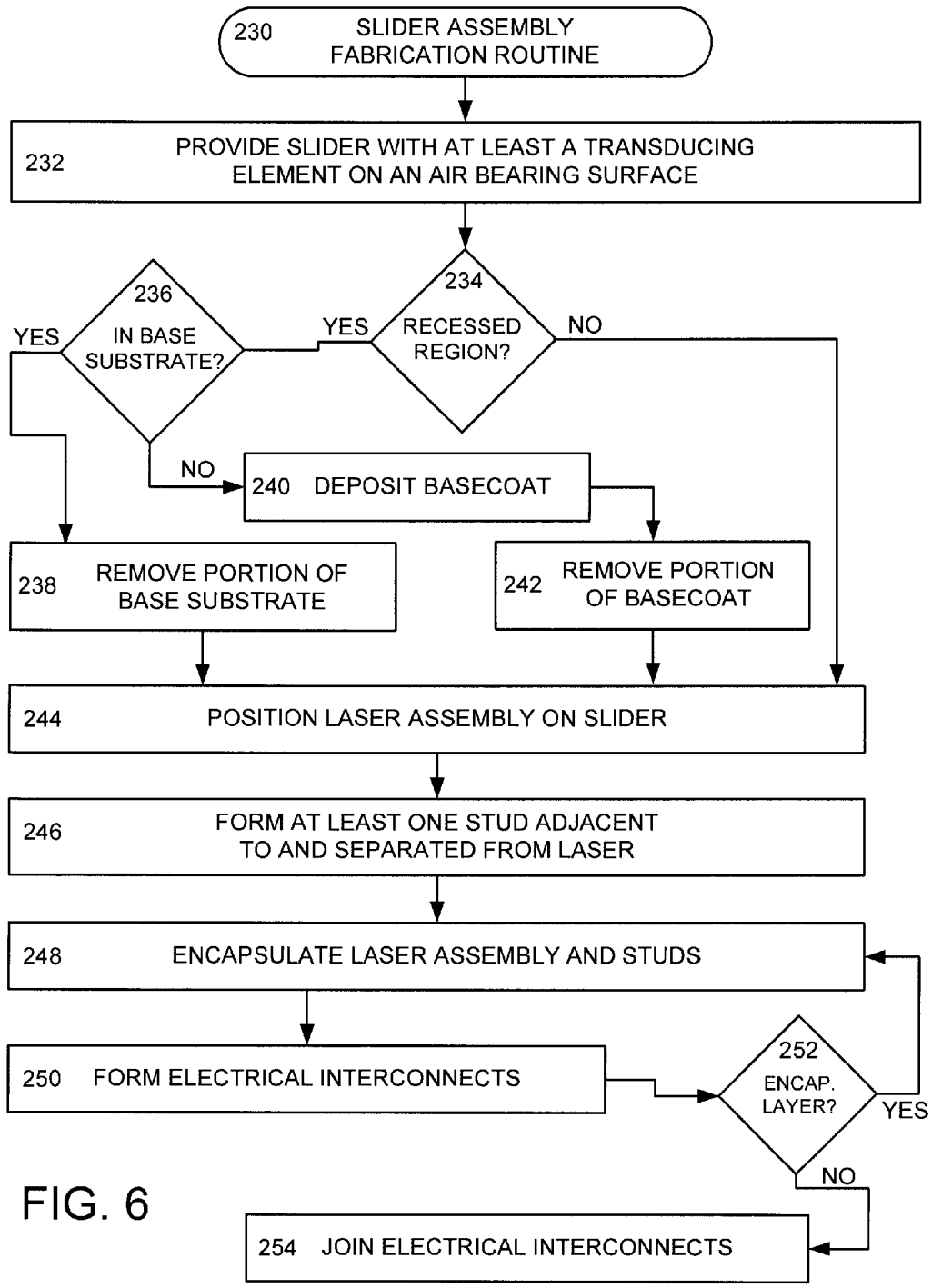
FIG. 6 maps an example slider assembly fabrication routine carried out in accordance with various embodiments of the present invention.

The various layers, components, configurations, and placements of the slider assembly 200 are not required or limited to that shown in FIGS. 5A-5C and can include at least formed electrical regions 228 that serve to interconnect various underlying electrical pads 220 while bringing the connection to the accessible top surface of the second encapsulation layer 226. FIG. 6 supplies a flowchart mapping an example slider assembly fabrication routine 230 that can be used to construct a variety of different configurations tuned for performance in accordance with various embodiments of the present invention. The routine 230 begins in step 232 by providing a slider with at least a transducing element on an air bearing surface (ABS). The slider may be provided with an AlTiC base substrate layer covered at least partially by a basecoat layer. The base substrate layer can have one or more electrical contact pads that are exposed by removing portions of the basecoat layer.

A determination is subsequently undertaken with decision 234 of whether or not a recessed portion is to be formed in the slider. An affirmative determination yields to decision 236 where the location of the recessed portion is chosen between the base substrate layer and the basecoat layer. If the base substrate layer is where the recessed portion is to be formed, step 238 removes the predetermined portion of the base substrate. However, if the basecoat is to be the location of the recessed portion, step 240 deposits at least a portion of the basecoat layer on the base substrate layer and then removes the predetermined portion of the basecoat layer in step 242.

It should be noted that the manners in which the various layers are deposited and material removed in routine 230 are not limited. For example, the basecoat layer can be deposited with any deposition technique, such as atomic layer, chemical layer, physical vapor, and sputtering deposition, just as portions of the basecoat layer can be removed with any technique, such as etch, wet etch, vacuum etch, and ion beam etch. In some embodiments, different deposition and material removal techniques are used for the various layers of the slider assembly constructed in routine 230.

With the basecoat layer deposited and formed from steps 240 and 242, step 244 positions a laser assembly on a predetermined region of the slider, either in the recessed portion or on a designated location on the basecoat. The laser assembly may be a single piece or a plurality of pieces, such as a laser substrate, laser carrier, and waveguide coupler. Step 246 then forms at least one stud adjacent to and separated from the laser assembly. As illustrated in FIGS. 3A-3C, the studs can be a variety of different sizes and positions in relation to the laser assembly to provide different gap lengths to tune the encapsulation of the laser assembly.

While not limiting, the formation of the various studs and electrical elements in routine 230 can correspond to individual patterns, such as photoresist patterns, that allow for precise formation and efficient removal of the pattern after use. In some embodiments, a plurality of different patterns can be used to form multiple studs on opposite sides of laser assembly, with each stud being isolated from one another. The formation of at least one stud may be followed by the filling of the gap between each stud and the laser assembly.

Regardless of whether the gaps are filled with material or air, step 248 subsequently deposits an encapsulation layer, which may be AlO or any other material capable of sealing the laser assembly with a continuous layer that spans from each stud to the laser assembly. In step 250, portions of the encapsulation layer are removed to expose contact portions of the laser assembly and one or more studs where electrical interconnects are then formed. Various embodiments form interconnects that laterally span over at least one stud from the laser assembly before connecting to a different stud. Such embodiments can further have a contact pad formed, in isolation, on at least one stud.

Step 250 can additionally include the successive formation and joining of electrical traces with existing and newly formed contact pads. As displayed in FIGS. 5A and 5B, such traces can continuously flow from the slider, up the side of the laser assembly or stud, and join with contact pads on the top surface of the laser assembly. Next, decision 252 determines if another encapsulation layer is to be laid over some or all the electrical interconnections formed in step 250. If an additional layer is to be deposited, the routine 230 returns to step 248, but if no more layers are to be formed, step 254 joins electrical pads and traces along the top plane of the laser assembly and studs to finalize the electrical operation of the slider assembly.

Through the routine 230, a slider assembly is constructed with tuned encapsulation that allows for enhanced sealing of a laser assembly without any thinning procedures while bringing the electrical interconnections up to a common top plane. However, the various steps of routine 230 are not required or limited as any of the decisions and steps can be omitted, changed, and added. For example, joining of electrical connections in step 254 can be done in conjunction with the formation of the electrical interconnections in step 250.

It can be appreciated that the assembly and configuration of the slider assembly provides enhanced operational and structural characteristics in the form of improved space management in reduced form factor data storage devices. The improved sealing of the laser assembly by positioning studs adjacent thereto provides a predetermined gap that allows an encapsulation layer to reliability seal the assembly without worry about continuously coating both the top and sides of the laser assembly. It will be appreciated that the claimed subject matter can readily be utilized in any number of other applications, including non-data storage device applications.

It is to be understood that even though numerous characteristics and advantages of various embodiments of the present invention have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A data storage device comprising:
   a slider with an air bearing surface (ABS) and a laser recess formed in a top surface of the slider, opposite the ABS surface;
   a laser positioned in the laser recess, the laser extending from the slider to a top plane;
   a dielectric stud formed adjacent to and separated from the laser on the top surface of the slider, the stud extending from the top surface of the slider to the top plane; and
   a dielectric encapsulation layer continuously covering the laser and stud at the top plane.

2. The data storage device of claim 1, wherein a plurality of studs are each formed adjacent to and separated from the laser on opposite lateral sides of the laser.

3. The data storage device of claim 1, wherein the laser is positioned to exert laser energy parallel to the ABS.

4. The data storage device of claim 3, wherein a waveguide on the slider directs laser energy to a predetermined region of an adjacent data storage media positioned across the ABS from the slider.

5. The data storage device of claim 4, wherein the waveguide is laminated between two basecoat layers of the slider.

6. The data storage device of claim 1, wherein the laser recess is formed in a base substrate of the slider.

7. The data storage device of claim 6, wherein the base substrate is AlTiC.

8. The data storage device of claim 1, wherein the laser recess is formed in a basecoat of the slider.

9. The data storage device of claim 1, wherein the laser is a laser assembly with at least a laser substrate and active region.

10. The data storage device of claim 1, wherein the encapsulation layer continuously spans a gap between the stud and the laser.

11. An apparatus comprising:
    a slider with an air bearing surface (ABS);
    a laser positioned on the slider, the laser extending from the slider to a top plane;
    first and second dielectric studs each formed adjacent to and separated from the laser on opposing lateral sides of the laser by respective first and second gaps, each stud extending from a top surface of the slider to the top plane; and
    a continuous encapsulation layer formed along the top plane that covers the laser and spans the first and second gaps to seal the first and second gaps and electrically isolate the laser from the studs.

12. The apparatus of claim 11, wherein the first and second stud have different lateral sizes.

13. The apparatus of claim 11, wherein the first and second gaps have dissimilar lengths from the laser.

14. The apparatus of claim 11, wherein at least one of the studs has a continuously curvilinear shape.

15. The apparatus of claim 11, wherein the first and second gaps are filled prior to formation of the formation of the encapsulation layer.

16. The apparatus of claim 11, wherein at least one electrical interconnect is formed in the encapsulation layer.

17. The apparatus of claim 16, wherein the electrical interconnect connects the laser to at least one stud.

18. The apparatus of claim 16, wherein the electrical interconnect is a trace that continuously flows from the slider to the top plane up a side of the first stud.

19. A method comprising:
    forming a laser recess in a slider positioned on an air bearing surface (ABS), the laser recess formed in a top surface of the slider, opposite the ABS surface;
    positioning a laser in the laser recess, the laser extending from the slider to a top plane;
    forming a dielectric stud adjacent to and separated from the laser on the top surface of the slider, the stud extending from the top surface of the slider to the top plane; and
    depositing a continuous dielectric encapsulation layer covering the laser and stud at the top plane.

20. The method of claim 19, wherein the encapsulation layer covers and seals a gap between the laser and stud.

* * * * *